Patented Nov. 26, 1929

1,737,402

UNITED STATES PATENT OFFICE

EUGENE E. AYRES, JR., OF CHESTER, AND LEE H. CLARK, OF PHILADELPHIA, PENNSYLVANIA, ASSIGNORS TO THE SHARPLES SPECIALTY COMPANY, OF PHILADELPHIA, PENNSYLVANIA, A CORPORATION OF DELAWARE

PROCESS OF REFINING FATTY OILS

No Drawing. Application filed July 15, 1922. Serial No. 575,305.

This invention is a process of removing impurities, including coloring matter, from crude fatty oils, by treating such oils with a limited amount of water or aqueous solutions so as to obtain intimate contact of the water with the contained impurities, whereby the impurities are hydrated and rendered insoluble in the oil, and then removing the hydrated impurities from the oil. As a result of such treatment, oils treated with reasonable promptness after production will deteriorate much less rapidly, require less alkali for refining, and yield a larger amount of refined oil of improved color.

The usual refining of fatty oils, especially vegetable oils, involves their treatment by caustic soda, which reacts with the free fatty acid present with the formation of soap, the caustic soda also uniting with a portion of the impurities comprising the coloring matter, and in addition some of the impurities are enmeshed by the precipitated soap. The soap settles to the bottom of the refining kettle. The supernatant oil is essentially neutral, and contains less impurities than the crude oil.

In U. S. Patent 1,247,782, there is described a process of recovering refined neutral oil by which the yield is increased and it is made possible to recover approximately 60% of the oil held in the soap stock or "foots" which results from the caustic soda treatment. This valuable recovery is thus restricted by the action of the impurities (carried down with the soap) as emulsifying agents, which render the foots emulsions highly stable.

In our efforts to increase this yield, we have found that a large part of the coloring matter and other impurities can be removed from crude fatty oils by intimate admixture therewith of the limited amount of water or aqueous solutions (generally less than 3%) that is required for hydrating the impurities with substantial completeness. The phenomenon involved is not a mere absorption, due to the porosity of the substance into which the water enters, it is distinctly not a solution, but it is apparently a molecular union somewhat analogous to the taking up of water of crystallization by salt, or to the taking up of water in small quantities by gelatin, as distinguished from the solution of gelatin and water. Such phenomena are commonly referred to as hydration, and such term is used herein to define the peculiar relationship resulting from the combination of the impurities with small amounts of moisture in the manner specified. The resultant product of the union of the water with the impurities appears to be almost completely homogeneous under a high power microscope though in some cases there may be incidental traces of suspended solids previously present in the oil and enmeshed with the hydrated mass formed by the treatment.

As impurities thus removed would otherwise react with caustic soda, used in subsequent refining, to form a highly active emulsifying agent, it follows that by the removal of such impurities more neutral oil can be recovered, the color of the recovered oil is better and less caustic soda is required. The removal of the alkali-absorbing impurities appears to render it unnecessary to use more than a small fraction of the normal excess of alkali as indicated by the acidity determined by a usual titration. As a smaller amount of alkali is required and consequently a smaller amount of soap stock is produced, the capacity for enmeshing and emulsifying oil is reduced not only by reason of the smaller amount of impurities, but also by reason of the smaller amount of soap stock, with resulting increase in the yield of neutral oil; and the absence or reduction of emulsifying impurities as a result of the treatment increases the recovery of neutral oil centrifugally.

Our process is definitely distinguished from mere washing with water. The impurities in the crude fatty oils are not soluble in water and are not considered extractable by water generally. The hydrated impurities are not only insoluble in an excess of water but such excess appears to interfere with the hydration, the desired results being obtained by the use of a small amount of water. But the quantity of water to be used will vary with different oils, and we have found it desirable to determine by trial the amounts to be used. In the case of a particular crude cotton seed oil it has been found that 2% of water will give more satisfactory results than 5% or more, but the use of 5% of water gave results sufficiently satisfactory for practical purposes.

If the quantity of water used is merely enough to hydrate the impurities, the tendency to produce an emulsion is reduced and the sludge precipitates in more easily removable form, whereas water in excess tends to form globules suspended in the oil and such water is often difficult to remove. Good results have also been obtained by the use of water having small quantites of starch, salt, acid or alkali dissolved therein so as to form dilute aqueous solutions, but saturated salt solutions have not been found satisfactory because the impurities are not hydrated in the presence of high salt concentration. The amount of water that will be effective for hydrating impurities may vary not only with different oils, but even with the same kind of oil. The amount of water necessary may vary, depending upon the origin of the oil, the method of production and other factors of a like nature. In practice the amount of water necessary to cause hydration of the impurities is determined by observing the character of the precipitate or sludge formed when water is added to the oil. Water is added until the sludge begins to show the presence of globules of free water mixed with it. The point of hydration is readily recognized by the accumulation thereafter of particles of free water and by the fact that the impurities when hydrated are rendered insoluble in oil. Any appreciable amount of free water interferes with the practice of the process. The presence of free water may be determined in any usual manner, as for instance, by microscopic examination or by measurement after centrifugal subsidence.

It is to be understood that it is important to avoid conditions that will result in the dehydration of the impurities.

The removable impurities of the crude fatty oils, being of the hydrophobe or water repelling classification in the sense that they tend to form water-in-oil emulsions, are immediately converted into hydrophile or water attracting colloids tending to stabilize oil-in-water emulsions, by contact with caustic soda. In the hydrophile stage the impurities apparently do not tend to hydrate with water. It is therefore impractical to employ an aqueous solution with more than a minute quantity of alkali.

The purpose of using a starch solution is to utilize the hydrophile properties of the starch to minimize the tendency of some oils to form stubborn water-in-oil emulsions.

In operating with a starch solution, by way of illustration, 20 grams of a 2% solution of corn starch is agitated moderately with 1000 grams crude cotton seed oil while temperature of the product is being raised to about 140° F. when flocculent masses of hydrated impurities have formed, the liquid is passed through a continuous high speed centrifugal adapted for separately discharging the treated oil and the sludge.

In general, in the practice of our process, contact between oil and water has been effected variously as by means of centrifugal emulsifiers and in tanks by the use of air and of mechanical agitators.

While final separation of the hydrated impurities has been effected either by permitting the mixture to settle in a tank or by the employment of high speed centrifugal separators, the more practical results have been secured by the use of centrifugal force because in the use of high force there is less liability to the loss of treated oil.

The temperature employed may be varied with the particular accompanying treatment and with the properties desired in the finished oil.

In a specific application of the process to the refining of crude cotton seed oil, the oil was agitated at a temperature of about 180° F. with 1% of water, the agitation being similar to that commonly employed in caustic soda refining. The product was allowed to settle for several hours, when the supernatant oil was decanted. The decanted oil compared with the raw crude for refining loss and color after refining each with lye in the usual manner according to the rules of the American Oil Chemists Society, and gave the results shown comparatively as follows:

| Refining | Oil | Per cent F.F.A. | Lye used 14° Bé. | Refining loss | Color (red) | Bleach (red) |
|---|---|---|---|---|---|---|
| No. 1 | Raw crude | 1.13 | 10.00 | 7.6 | 6.6 | 2.0 |
| No. 2 | Treated crude | .99 | 8.90 | 8.0 | 4.8 | 1.6 |
| No. 3 | Treated crude | .99 | 5.30 | 6.0 | 5.6 | 1.80 |

It appears that even when one-half the caustic soda excess indicated by the tables of the American Oil Chemists Society was used, the treated oil was over-refined as shown by the color. The refining loss was considerably reduced by the water treatment. The loss of oil by the water treatment was found to be about one per cent.

With every crude fatty oil, even of the same type, the quantitative results of the water treatment will be different, but the color will be improved and the material known as gums will be removed except in those cases where crude oil has been stored for long periods, say several years. The water treatment should be given to a fatty oil in as fresh condition as practicable, as the gradual spontaneous decomposition of crude fatty oil is influenced largely by the impurities contained therein and it has been observed that the crude oil, if promptly treated, will deteriorate less rapidly than the oil that has not been treated with water or an aqueous solution.

While this process effects important results preliminarily to and in the caustic soda refining process, the treatment effects results that are highly valuable independently.

In the practice of this invention, the water employed may be pure water, or, as above noted, the water may contain small quantities of starch, salt, acid or alkali provided the precautions set out above with respect to the presence of such substances in the water are observed.

Having described our invention, we claim:—

1. In the purification of fatty oils containing impurities which are soluble therein, the steps comprising heating and agitating such oil with a quantity of water equal to approximately one per cent to five per cent of the oil by volume and limited substantially to that amount thereof which the impurities will take up and therewith form compounds that are insoluble in the oil, thereby forming from the impurities compounds thereof with water that are insoluble in the oil and avoiding the presence in the oil of residual water free to emulsify with the oil, and separating said oil-insoluble compounds from the oil.

2. In the purification of fatty oils containing impurities which are soluble therein, the steps comprising treating such oil with a quantity of water equal to approximately one per cent to five per cent of the oil by volume and limited substantially to that amount thereof which the impurities will take up and therewith form compounds that are insoluble in the oil, thereby forming from the impurities compounds thereof with water that are insoluble in the oil and avoiding the presence in the oil of residual water free to emulsify with the oil, and separating said oil-insoluble compounds from the oil.

3. In the purification of fatty oils containing impurities which are soluble therein, the steps comprising treating such oil with a quantity of water containing starch in solution and limited substantially to that amount thereof which the impurities will take up and therewith form compounds that are insoluble in the oil, thereby forming from the impurities compounds thereof with water that are insoluble in the oil and avoiding the presence in the oil of residual water free to emulsify with the oil, and separating said oil-insoluble compounds from the oil.

In testimony whereof we have hereunto set our names this 13th day of July, 1922.

EUGENE E. AYRES, Jr.
LEE H. CLARK.